UNITED STATES PATENT OFFICE.

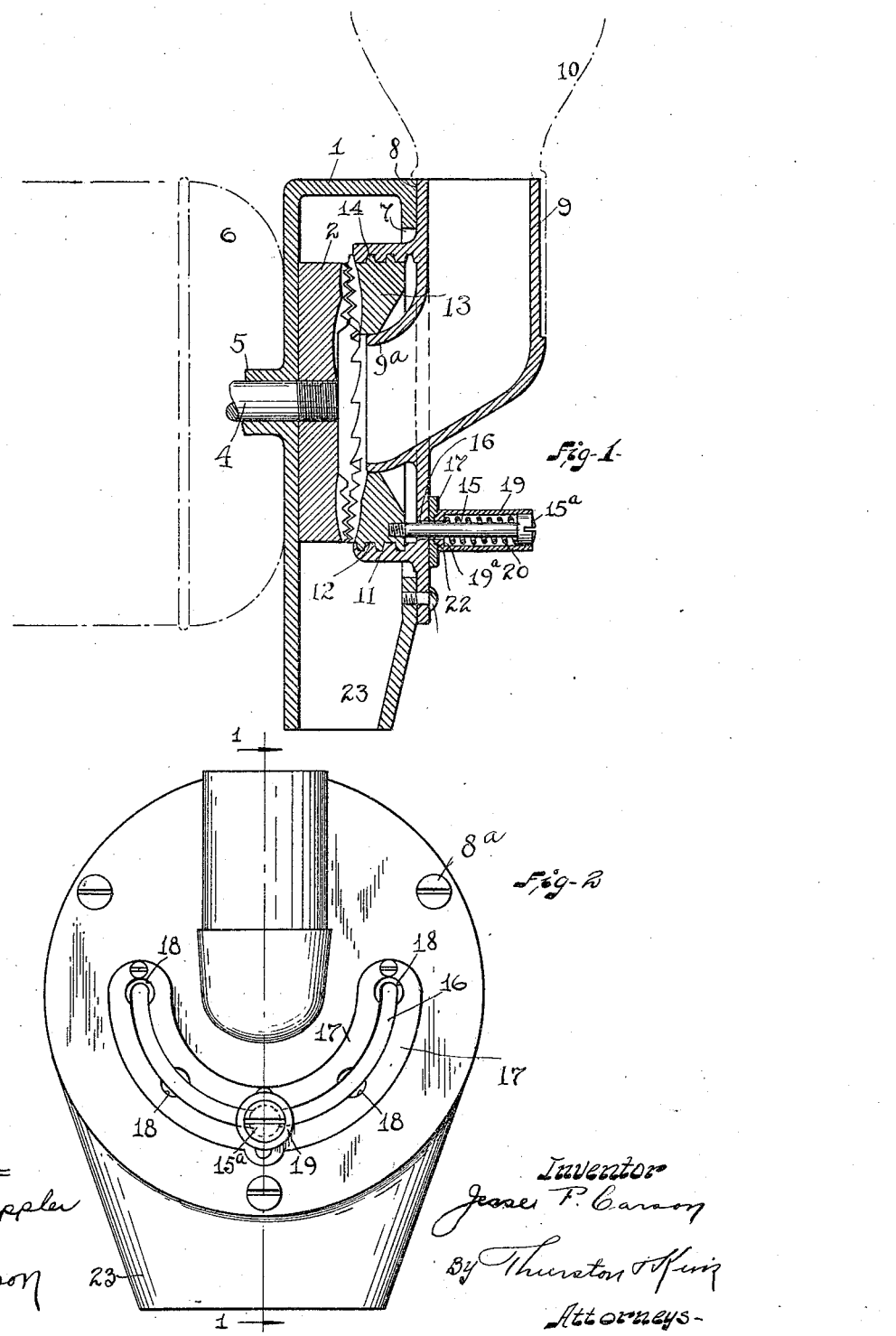

JESSE F. CARSON, OF CLEVELAND, OHIO, ASSIGNOR TO THE CLEVELAND ELECTRIC AND MACHINE MANUFACTURING COMPANY, A CORPORATION OF OHIO.

COFFEE-MILL.

1,184,072.  Specification of Letters Patent.  Patented May 23, 1916.

Application filed September 11, 1914. Serial No. 861,173.

*To all whom it may concern:*

Be it known that I, JESSE F. CARSON, a citizen of the United States, residing at Cleveland, in the county of Cuyahoga and State of Ohio, have invented a certain new and useful Improvement in Coffee-Mills, of which the following is a full, clear, and exact description.

This invention relates to a mill construction, which is more particularly intended for the breaking and grinding of coffee beans.

The object of the invention is to provide a construction, which will effect a simple and easily accomplished adjustment of the grinding burs, with respect to each other for the purpose of effecting various degrees of fineness to which the coffee beans are to be ground, and further provide a convenient, quick way to clean the burs, and further to provide a construction permitting easy access to the interior of the mill.

Generally speaking, the invention provides the elements and combination thereof set forth in the accompanying claims.

Reference should be had to the accompanying drawings forming a part of this specification, in which—

Figure 1 is a vertical, transverse section through a portion of the coffee mill, and Fig. 2 is a front elevation of a portion of the coffee mill.

At 1 there is represented a casing within which are housed the grinding burs. The driven bur which is represented at 2 is mounted upon a shaft 4, which is suitably mounted in a bearing indicated at 5 in the wall of the casing. This shaft may be turned in any desired manner, and for the purpose I have indicated at 6 a motor by which the shaft 4 may be driven. The casing is provided in the front wall with a substantially circular opening which may be represented at 7. As a cover for the opening 7, there is a plate 8, which is secured upon the casing in any desired manner, as by means of screws 8ª indicated in Fig. 2. This plate is provided with an upwardly extending spout 9, which is adapted to receive a receptacle indicated at 10, in which the coffee to be ground may be poured. The spout 9 has an inwardly extending portion represented at 9ª, which extends to discharge coffee adjacent the grinding surfaces of the burs.

The bur 13 is mounted so as to have a limited amount of turning movement, and between the bur 13 and its mounting there is coöperating means, such that the bur 13 is moved linearly or in a direction toward or from the driven bur as the bur 13 is turned, thereby to alter and adjust the distance between the faces of the burs. There are various ways of accomplishing this result, and, further, a construction may be provided whereby the driven bur may be made adjustable, but for purposes of disclosing the principle involved I have embodied it in the following construction: Upon the interior wall of plate 8 is an inwardly extending cylindrical flange 11. Upon the interior surface of this flange 11, threads are cut which are indicated at 12. The bur 13 sets within flange 11, and is provided with threads upon its exterior surface which are indicated at 14, the threads 12 and 14 being of proper pitch to coöperate with each other. The bur 13 has a central opening into which extends the lower extending portion 9ª of the spout 9, so that coffee passing through the spout 9 is introduced directly to the engaging surfaces of the burs. Turning movement imparted to the bur 13 will, by virtue of the screw thread engagement with the flange 12, cause the bur 13 to move either toward or from the bur 2. The turning of the bur 13 is accomplished upon the outside of the casing 1 by means of a pin 15, which is secured to bur 13, and extends to the inside of the casing through a slot 16, which is formed in the plate 8. This slot is concentric with the center of the bur.

For holding the pin 15 in an adjusted position, I have provided upon the outside of the plate 8 an arc strip 17, which is provided with notches 18 at various points in its length. Surrounding the pin 15 is a sleeve 19, and within the sleeve is a spring 20 which bears against the head 15ª of the pin 15. This spring at its lower end bears against a shoulder 19ª of the sleeve 19. It will be apparent that the action of the spring is normally to push the sleeve 19 against the plate 17. The end of the sleeve 19 is provided with an extension indicated at 22, which is adjusted to fit and engage with the various notches 18 formed in the plate 17. I have shown five sets of notches, but it will be apparent that more notches may be provided to effect different positions of the bur 13 where such is desired.

The coffee which has passed between the burs 2 and 13 finds exit through the outlet 23.

It will be seen that the mill really comprises two units, the casing which carries one of the burs, and the plate which carries the other bur and its adjusting mechanism. The removal of the plate 8 exposes the entire mechanism of the mill and makes it easy of access for purposes of repair or other purposes.

The ease and readiness with which the burs may be moved toward and from each other, renders the burs practically self cleaning, for if some foreign substance, such as pieces of iron or stone, passes with the coffee beans to the burs, it is not necessary to take the mill apart, but simply to move the pin 15 so as to open the distance between the burs whereupon the foreign substance will drop through, subsequently the pin 15 may be moved to return the burs to their original position.

Details of construction may be varied from what has heretofore been described without departing from the spirit of this invention.

Having thus described my invention, what I claim is:

1. In a coffee mill construction, combination with a casing, a cylindrical flange extending from one wall of said casing, and a bur mounted within the said flange, means for turning the said bur, there being a central opening in the opposite wall of said casing, a plate having a flange extending into the opening on the wall of said casing, a normally stationary bur mounted within the said flange, a charging spout mounted upon said plate, said plate being adapted to be secured to the casing whereby the charging spout extends within the opening of the normally stationary bur.

2. In a coffee mill construction, combination with a casing, a pair of oppositely disposed burs located within said casing, means for turning one of said burs, the other of said burs having a screw threaded engagement with its mounting, a plate having an arcuate slot therein which is coaxially arranged with respect to the burs, a pin secured to the bur having the screw threaded engagement and extending through the slot in the plate, whereby the bur having screw threaded engagement may be moved to effect adjustment between the grinding faces of the bur, and means for securing said pin in an adjusted position in the said slot.

3. In a coffee mill construction, combination with a casing, oppositely disposed burs within the casing, means for turning one of said burs, the other of said burs being provided with a central opening, the said bur with the central opening being provided with a spiral screw thread upon a portion thereof, a plate having a portion provided with a spiral thread which engages with the thread upon the bur, a charging spout carried by said plate, and having a portion which, when the plate is in position upon the casing, extends into the opening formed in one of the said burs, the said plate being provided with an arcuate slot, which is cylindrical with respect to the axis of the burs, a pin secured to the burs having the screw threads thereon, and extending outwardly through the slot in the said plate whereby the screw threaded bur may be turned to effect an adjustment between the grinding surfaces of the burs, and means for holding the pin in adjusted position in the slot.

4. In a coffee mill construction, combination with a casing, having an opening in one side thereof, a bur supported in said casing, a plate to cover the opening in said casing, a bur carried by said plate, said bur being adjustably mounted in said plate and when the plate is in position, adapted to operate with the other bur, said bur upon the plate being adaptable to vary the distance between the grinding faces of the burs, said plate and bur being removable as a unit and means for turning one of said burs.

5. In a coffee mill construction, combination with a casing, having an opening in one side thereof, a bur supported in said casing, a plate adapted to cover the opening in the said casing, a bur carried by the said plate, said bur having a central opening, a delivery spout carried by the plate having an extension which extends into the opening of the said bur, said plate and the parts carried thereby being removable as a unit and means for turning one of said burs.

In testimony whereof, I hereunto affix my signature in the presence of two witnesses.

JESSE F. CARSON.

Witnesses:
A. J. HUDSON,
L. I. PORTER.